Jan. 3, 1939. J. SCHAAF 2,142,737
SEWAGE SCREENING APPARATUS
Filed July 17, 1936 3 Sheets-Sheet 3

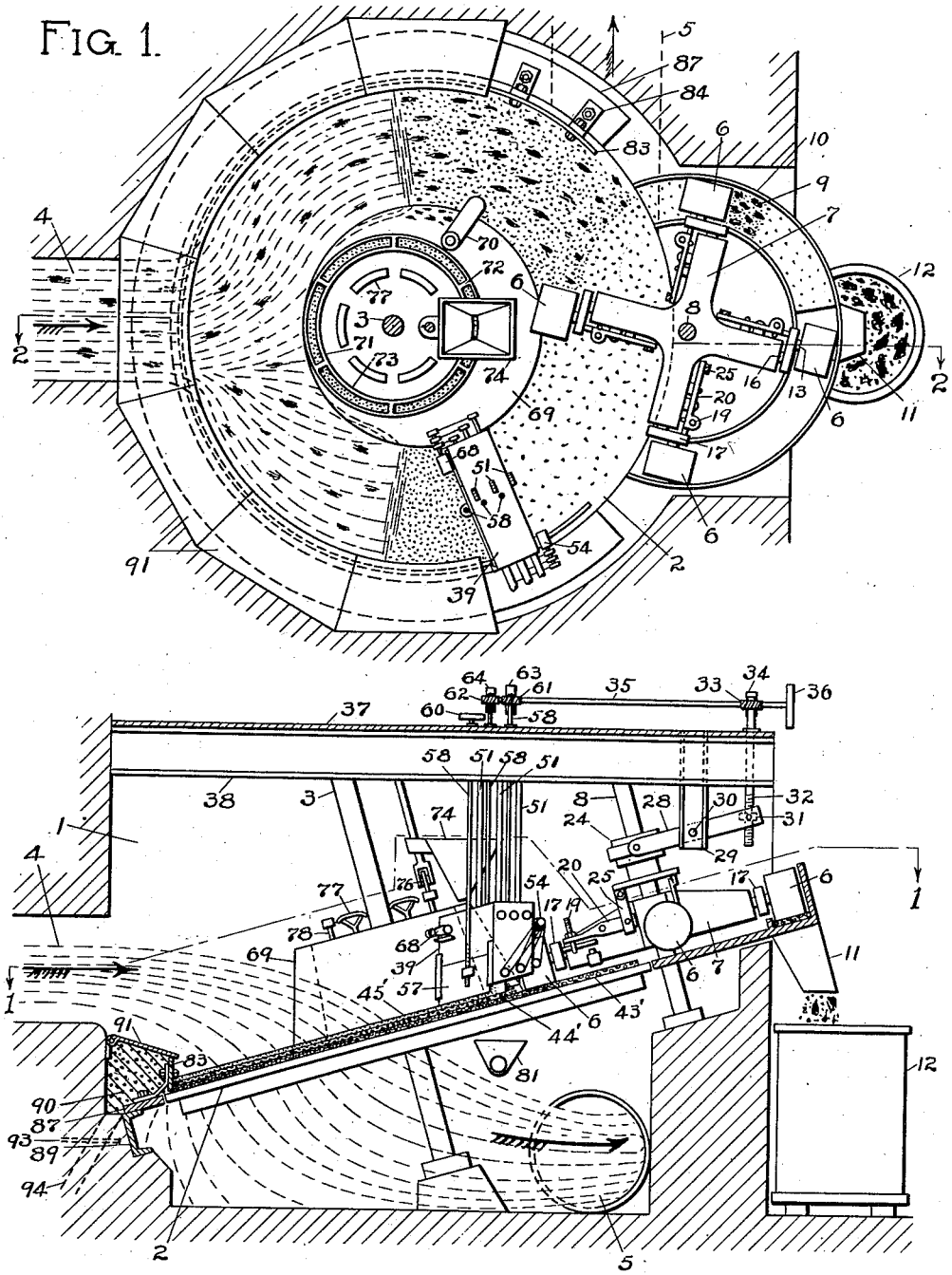

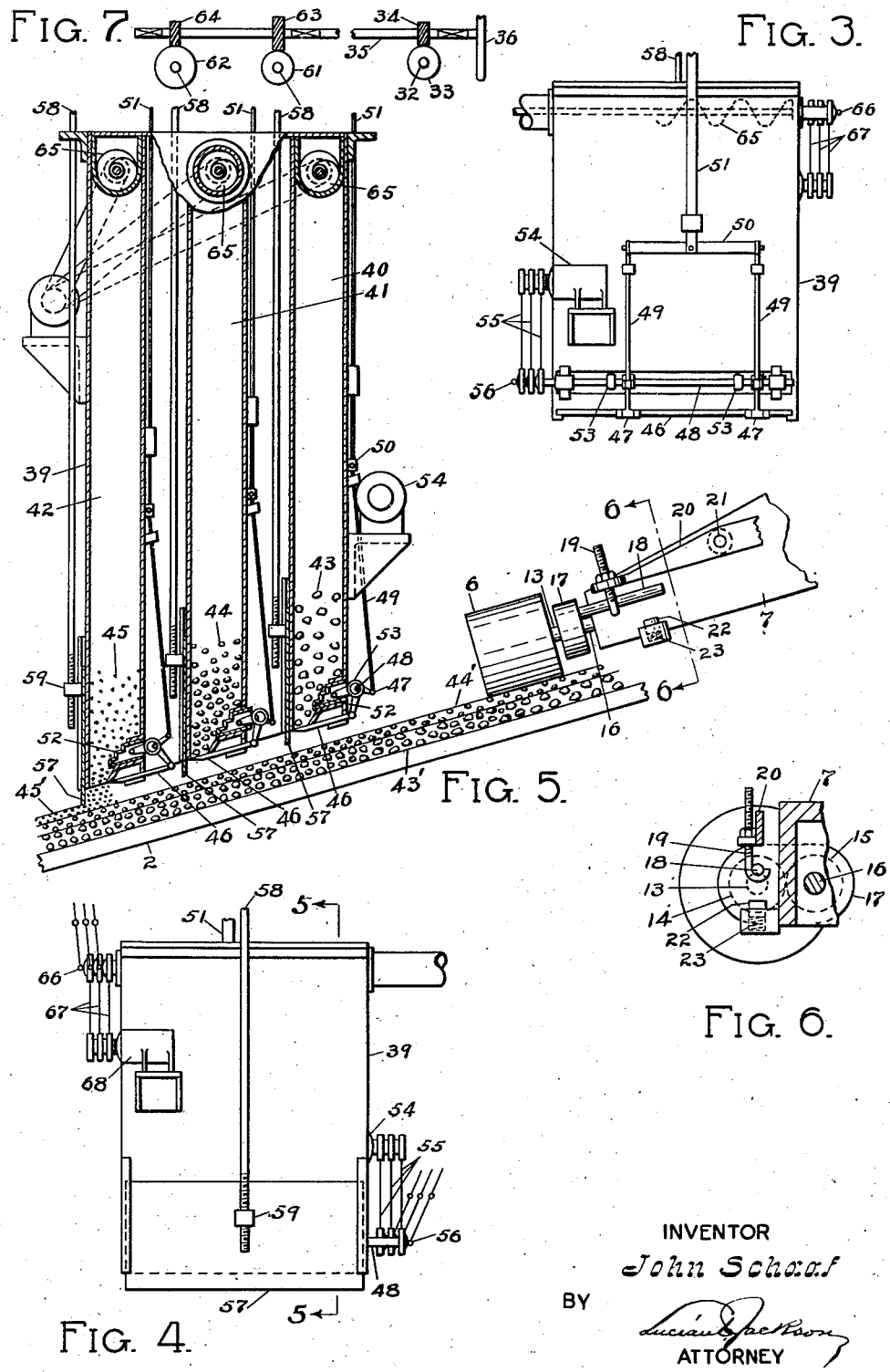

INVENTOR
John Schaaf
BY
ATTORNEY

Patented Jan. 3, 1939

2,142,737

UNITED STATES PATENT OFFICE 2,142,737

SEWAGE SCREENING APPARATUS

John Schaaf, Buffalo, N. Y.

Application July 17, 1936, Serial No. 91,117

16 Claims. (Cl. 210—196)

My invention relates to means for separating solids from sewage and more particularly to filtering the liquid through filtering material or medium on a movable screen.

One object of my invention is to provide means for spreading one or more layers of filtering material on a rotating screen and for continuously removing a layer or layers or all of said filtering material with the accumulated solids.

Another object is to provide means to apply layers of different filtering materials on a screen and means to regulate the amount of filtering material removed.

Another object is to provide means to hold filtering material around the submerged edge of said screen and to provide an improved wearing ring in juxtaposition to the screen edge.

With the foregoing and other objects in view which will appear as the description proceeds, the invention consists in certain features of novelty in the construction, combination and arrangement of parts by which the said objects are attained, the invention being more particularly pointed out in the claims, It will be understood that my device may be used for the separation of any solids from liquids and that various changes may be made in the construction and arrangement of parts without departing from the spirit or sacrificing any of the advantages of the invention as set forth in the appended claims.

Referring to the drawings:

Figure 1 is a plan of my improved sewage screening apparatus consisting of a circular rotatable screen mounted in a sewage stream and with means for spreading and removing filtering medium or material and showing parts in section on line 1—1 of Fig. 2.

Fig. 2 is a side elevation of the screen and rotating brushes with the sewer walls and a portion of the parts at the edge of said screen in section on line 2—2 of Fig. 1, and showing the path of flow of the sewage stream.

Fig. 3 is one side elevation of the hopper for holding and spreading filtering material or medium on the screen and showing screw for filling hopper, motor for feeding filtering material from the bottom of said hopper and mechanism for operating a gate at the bottom of hopper.

Fig. 4 is the other side elevation of the filtering material hopper showing the motor for operating the screws to feed filtering material into the top of hopper and filtering material spreader at bottom of said hopper.

Fig. 5 is an end elevation of the hopper, mostly in section on line 5—5 of Fig. 4, feeding a layer of filtering material from one portion of said hopper onto the screen and one of the rotating brushes located to remove said layer.

Fig. 6 is a section through one arm of the brush holding spider on line 6—6 of Fig. 5 to show the means for regulating the raising and lowering of the brush.

Fig. 7 is a plan of the gearing means for raising and lowering filtering material spreaders in conjunction with the raising and lowering of the rotating brushes.

Figure 8:
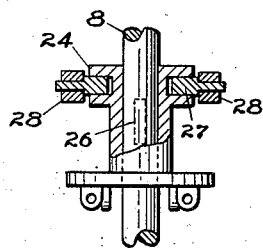
Fig. 8 is a portion of the shaft for operating the brush holding spider and with a sleeve, partly in section on line 8—8 of Fig. 9, for raising and lowering the rotating brushes.

In the figures, 1 is a chamber in which a flat disk screen 2, mounted on a shaft 3, is slowly rotated clockwise. The screen 2 can be placed horizontal or tilted at an angle to the influent 4 as shown in Fig. 2, but in any case it is so located in the line of the sewer as to intercept the entire flow and with a submerged portion about as shown. 5 is the effluent flowing from chamber 1.

In the type of screening apparatus shown, the rotary disk screen 2 is swept by clockwise rotating brushes 6 supported by the arms of a spider 7 and said spider rotated by a shaft 8 which is located outside of the screen 2. The source of power for rotating screen 2 is applied through shaft 8 and a gear (not shown) on said shaft 8 opposite the lower part of said screen 2 meshes with pin teeth (one of which is shown as 92 in Fig. 12) but is not further illustrated as it forms no part of this invention. In my construction the brushes 6 sweep accumulated sewage solids 9 with a layer of filtering material from said screen 2 into a trough 10 from which it drops through spout 11 into ejector pot 12. The layer of filtering material swept from the screen by the brushes 6 may consist of any portion or all of the one or more layers of material which are spread on the screen 2 from the hopper 39 as explained later.

The brushes 6 (Figs. 5 and 6) are each mounted on a short shaft 13 and rotated by means of a gear 14 on said shaft 13 meshed with a gear 15 on shaft 16. The gearing for rotating the shaft 16 and thus the brush 6 is not shown as it is operated by a stationary gear around the spider shaft 8 or by a gear on a shaft through the shaft 8 and forms no part of this invention. The gears 14 and 15 are located in a housing 17 which allows the brush 6 to be moved up and down independently of the spider 7 and the shaft 16. A pin 18 extending from the housing 17 is held by a U bolt 19, threaded for adjustment, to support the housing 17 and the brush 6 in a position to sweep off the amount of filtering material desired, as the weight of brush 6 and shaft 13 together with the direction of rotation of gears 14 and 15 force the brush 6 downward. 20 is a lever pivoted at 21 on spider 7 and holding U bolt 19 at its outer end.

In Fig. 5 the brush 6 is shown in position to sweep off the top layer of filtering material which is being spread from one portion of the hopper 39 and by lowering the brush 6 by means of the lever 20 until it sweeps off all the filtering materials on the screen 2, the pin 18 will then contact with the bumper 22 and be resiliently held from too much pressure on said screen 2 by the spring 23.

Figure 9:
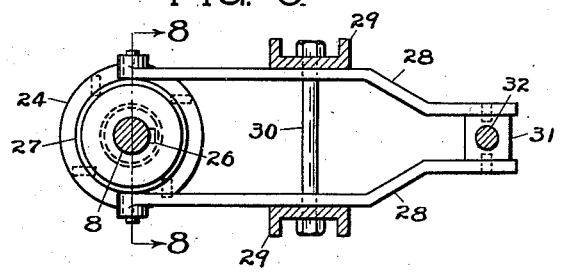
Fig. 9 is a plan of the levers for operating the sleeve of Fig. 8.

The inner end of lever 20 is connected to the sleeve 24 on shaft 8 by means of a link 25 pivoted at both ends (Fig. 2). The sleeve 24 is free to slide up and down on shaft 8 and is driven by said shaft 8 by means of a feather 26 (Figs. 8 and 9). The sleeve 24 has a groove fitted with a collar 27 for moving said sleeve up and down on shaft 8. Levers 28, 28 are fulcrumed to the channels 29, 29 by means of a bolt 30 and pivoted at one end of the collar 27 and at the opposite end to a nut 31. A vertical shaft 32 extending through the floor 37 on beams 38, is threaded at its lower end to engage nut 31 and provided at its upper end with a spiral gear 33 to mesh with, and be operated by, a spiral gear 34 on a horizontal shaft 35 having a hand wheel 36.

Referring to Figs. 3, 4 and 5, a hopper 39—supported by beams 38 above it in Fig. 2 (supports not shown)—is provided with compartments 40, 41 and 42 for holding filtering medium of different materials or different grades of materials as 43 for coarse, 44 for medial and 45 for fine. When spread in layers on screen 2 the layers are designated as 43' for the coarse bottom layer, 44' for the second layer of medial material and 45' for the top layer of fine material.

As each of the compartments 40, 41 and 42 and its operating mechanism is similar, the mechanism of one compartment will be described.

At the bottom of a compartment is a gate 46 operated above the floor 37 by means of a bell crank 47 fulcrumed on shaft 48, rods 49 connected by an evener 50 and a vertical handle 51. Near the bottom of a compartment is a shaker 52 for feeding its filtering material through an opening at the bottom of said compartment when said opening is uncovered by the gate 46. Shaker 52 extends the width of a compartment and is reciprocated a short distance by means of eccentrics 53 on the shaft 48. Shaft 48 is operated from a motor 54, by means of a belt 55 to selectively operate the shaft 48 of any compartment, and a clutch 56. Filtering material is therefore fed on to the screen 2 from one compartment as in Fig. 5 or from more than one compartment at the same time, as in Fig. 2. 57 is a plate located outside of a compartment and acts as a spreader for the material fed from said compartment. 58 is a vertical shaft extending above the floor 37 and threaded at the bottom to engage with a boss 59 on the spreader 57 and will lower said spreader when rotated in one direction and raise it when rotated in the opposite direction. As shown in Fig. 2 the shaft 58 for the spreader 57 of compartment 42 is provided with a hand wheel 60 for rotating said shaft, as filtering material from compartment 42 is supplied nearly all the time the screen 2 is operated and consequently spreader of material 45 is seldom changed in position unless to vary the depth of layer 45'.

The shafts operating the spreaders of the materials 43 and 44 are provided at the top above floor 37 with spiral gears 61 and 62, respectively, to mesh with spiral gears 63 and 64, respectively, on shaft 35 (Figs. 2 and 7), so that when the brushes 6 are lowered to sweep off the layers of material 44' or 43', respectively, on screen 2 by rotating the hand wheel 36, the spreaders for the materials 44 or 43 from compartments 41 and 40 will be lowered to the proper position to replace said materials in layers 43' and 44'.

The filtering material employed can be of any suitable granulated material as sand, crushed stone or other material to be disposed of with the sewage solids or to be recovered and used again. The filtering material can also be a granulated coal or the like to furnish combustible material when it is desired to burn the sewage solids.

The filtering materials are supplied to each of the compartments 40, 41 and 42 as needed by means of a screw 65, a clutch 66, belt 67 and motor 68.

The depth of any filtering material layer is varied either by raising or lowering any of the spreaders 57 or by sweeping off more or less of the filtering materials by the brushes 6. The layers 43', 44' and 45' are shown as being spread and removed in exact layers but it will be understood that, as in Fig. 5, the brushes 6 could be lowered to sweep off any part of layers 44' and 43' and then the depth of layer 45' would be increased to supply the amount of said layers, 44' or 43', removed. If the brushes 6, as in Fig. 5, were raised to sweep off only a part of layer 45' then the amount of layer 45' supplied from compartment 42 would be reduced or only equal to the amount removed. Also any spreader levels off for its layer the amount of material not already applied to the screen 2.

The disk screen 2 has openings or slots preferably of a shape to be swept longitudinally by the brushes 6 and the outer limit of these slots is shown in Fig. 1 as a dotted circle 96 and slightly inside of the material holding ring 83 described later. The inner limit of the screen slots is indicated by a dotted line 97 which is near to, but spaced from, the base of the cone screen 69. Where filtering material is used as in my invention the limiting of the screen slots is important as the flow of sewage through the slots directs the settling and collection of most of the sewage solids in the filtering material over the slots and hence away from the ring 83 and the base of the cone 69. Brushes 6, as shown, sweeping across screen 2 near the base of cone screen 69 leave some solids near said cone base. I have found that by keeping the slots away from the base of the cone 69 the sewage solids collect far enough away so the brushes are more effective and especially so in taking up the last layer of material as no solids are left at the base of the cone. If the brushes operated radially from the cone this would not be so important.

Mounted concentrically on the center of screen 2 (Figs. 1 and 2) and turning with it is a screen 69 in the form of a truncated cone. 70 is a rotating brush to sweep the sewage solids from the outer surface of the cone 69 and onto the flat screen 2. Back of cone 69 is formed an inner screen 71 also having the form of a truncated cone and separated from 69 by means of partitions 72. The sections 73 thus formed are filled with filtering material from the hopper 74 to hold filtering material back of the cone screen 69.

Figures 13, 14:
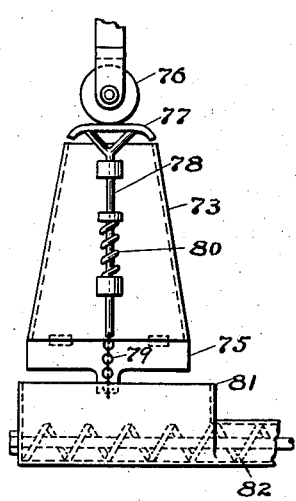
Figs. 13 and 14 are elevations of one of the sections of the cone screen to illustrate means for removing filtering material.

As a means of discharging the filtering material and the accumulated solids from each section 73, a hinged plate 75 is provided at the bottom of 73 and actuated by a roller 76 which can be lowered to contact with foot 77 to depress the rod 78 connected to said plate 75 by chain 79. The rod 78 is retracted by a spring 80 to raise the plate 75 when the section 73 has passed the roller 76. The discharged material drops into a trough 81 to be carried away by a screw 82. (Figs. 13 and 14.)

The filtering material in each section 73 can be changed as occasion requires or on each rotation of the screen 2, as the filling and discharging occur when said section is in its upper position and out of the sewage stream. (Fig. 2.)

Figure 10:
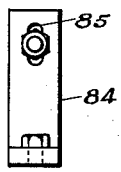
Fig. 10 is a side elevation of a brace for supporting the sections of the filtering material ring near the edge of the screen to show means for adjustment.
Figure 11:
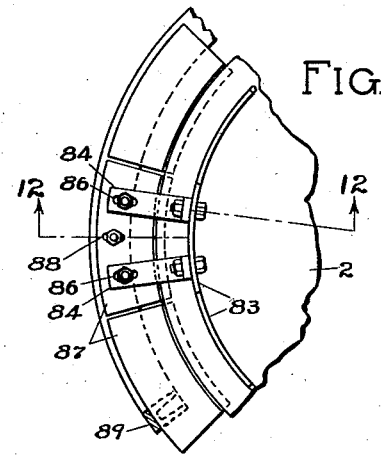
Fig. 11 is a plan of a portion of the screen, sections of filtering material ring, braces for said ring sections and sections of wearing rings, showing means for adjustment.
Figure 12:
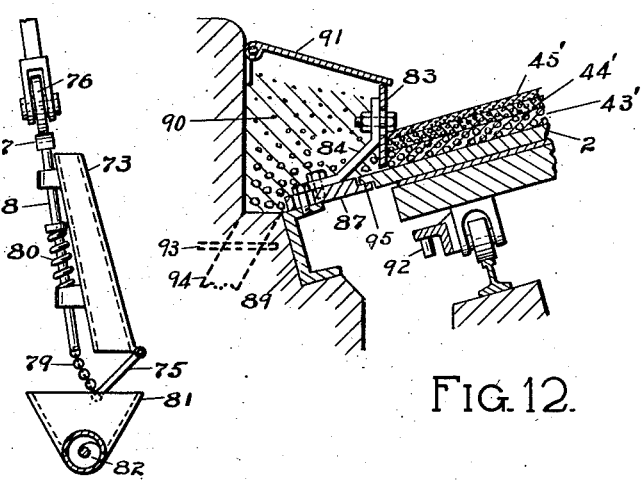
Fig. 12 is a sectional elevation on line 12—12 of Fig. 11, of the parts shown in Fig. 11.

In Figs. 10, 11 and 12 a portion of screen 2 is shown with a pin tooth 92, as one of a series, meshing with a gear (not shown) on shaft 8 for rotating screen 2, but principally to illustrate the filtering material ring and connected parts. 83 is the filtering material ring in sections as shown and supported above the screen 2 and near its periphery by braces 84 having elongated holes 85 and 86 for adjusting said ring sections 83 away from and toward the surface of screen 2 and away from and toward the periphery of screen 2. The material ring sections 83 are located close to the top surface of screen 2 to hold the filtering materials 43', 44' and 45' on said screen 2 and away from the screen periphery. 87 are wearing ring sections with elongated holes 88 for adjusting said sections near the periphery of screen 2. Wearing ring sections 87 as shown in Fig. 2 have a plain edge opposite the periphery of screen 2 but as a means of making a closer joint between said sections 87 and screen 2, sections 87 and screen 2 in Fig. 12 are provided with stepped portions as at 95. The material ring sections 83 are supported on the wearing ring sections 87 by the braces 84 while the wearing ring sections 87 are supported on the channel 89. The space around the outside of material section 83 is filled with a filtering material 90 and covered with hinged plates 91 principally for protection where the sewage stream 4 flows over plates 91 as shown in Figs. 1 and 2. 90 thus filters any sewage which seeps by the cover plates 91 or filtering material ring 83 and is changed as required by means of a gate 93 in opening 94.

In the operation of my sewage screening apparatus, the filtering material 90 is first introduced over the wearing ring sections 87 and covered with the plates 91. Rotating the screen 2, the sections 73 are filled with a filtering material from hopper 74. At the bottom of the hopper 39 the gates 46 below each compartment 40, 41 and 42 are opened and filtering material 43, 44 and 45 fed on to the screen 2 and spread by the spreaders 57 to make first a coarse material layer 43', a medial material layer 44' and a fine material layer 45' and the sewage stream allowed to flow into chamber 1. The sewage flowing against the submerged portion of the slowly moving screen deposits the floating and suspended solids on the filtering medium and the clarified water passes through the layers 45', 44' and 43' of said medium and screen 2.

After the three layers of material 43', 44' and 45' have been spread the gate 46 below each compartment 40 and 41 is closed and the brushes 6 are adjusted by means of hand wheel 36 to sweep off only the first layer 45'. The spreaders 57 of the compartments 40 and 41 will now assume positions above layers 43' and 44', as shown in Fig. 5, by the said adjustment of brushes 6.

The operation of the screening apparatus now proceeds for a time in this manner for several rotations of screen 2, the position of the brushes 6 removing the top layer of material 45' and the entrapped solids which have lodged in said top layer, sweeping said material and solids, as indicated by 9, through the trough 10 and into the ejector pot 12.

The layers 44' and 43' gradually become clogged with solids, the former somewhat faster than the latter on account of its upper position and size of granulated material and after an interval of time the brushes 6 are lowered to sweep off layer 44' as well as 45'.

The lowering of brushes 6, by the hand wheel 36 and gearing shown in Figs. 2 and 7, lowers spreader 57 of compartment 41 into proper position to spread layer 44' and a new and clean layer 44' (see Fig. 2) is now provided by opening gate 46 of said compartment 41. Brushes 6 are now in position to sweep off layers 44' and 45' and can continue in this position shown in Fig. 2 for one or several rotations. Gate 46 of compartment 41 is then closed and the brushes 6 are again raised to the position shown in Fig. 5 to remove only the top layer 45' for several more rotations of screen 2. After repeating the operation of removing and replacing layer 44' several times and the layer 43' has become somewhat clogged with solids the brushes 6 are lowered to sweep off all layers 45', 44' and 43', from the screen 2. The spreaders 57 of compartments 40 and 41 now being in position to spread layers 43' and 44', by the operation of gearing shown in Figs. 2 and 7 when lowering brushes 6, new and clean layers 43', 44' and 45' are provided by opening the gate 46 of each compartment 40 and 41 and the cycle of operations repeated.

The layers of material may be applied to the screen 2 and removed in the manner described or by any other combination of removing all or any part of the materials and spreading the materials from any one, two or three of the compartments. If, for instance, gates 46 to compartments 40 and 41 are closed and the brushes 6 are located as in Fig. 2, to sweep off materials down to layer 43' then material 45 from compartment 42 would be supplied to make a single layer on top of layer 43' equal to layers 44' and 45'. Or any two layers or any single layer can be used as convenient.

The spreaders 57 of compartments 40 and 41 can be arranged to be operated by hand independently of the operation of the lowering and raising of brushes 6 as by hand wheel 60 for compartment 42 (Fig. 2), or the spreader 57 of compartment 42 operated by gearing and shaft 35 the same as for compartments 40 and 41. Also the opening and closing of the gate 46 of any compartment can be connected to its spreader so that the lowering of the spreader to its spreading position will open said gate 46, and the raising of the spreader will close said gate.

In Fig. 5 the three layers of filtering materials 43', 44' and 45' are shown with the thickest layer at the bottom and the thinnest layer at the top. These layers can be varied to suit conditions but it will be noted that the brushes 6 when located in any position to sweep off a layer of material is prevented from moving downward by the U bolt 19, and so thinning a layer in spots, while said U bolt 19 (Fig. 6) does not prevent the movement of brushes 6 upward to clear an obstruction.

Having thus described my invention, I claim:

1. A sewage screening apparatus of the class described including a rotating screen having a stepped periphery, means to rotate said screen, a stepped wearing ring segment overlapping the stepped periphery of said screen, means to adjust said ring segment to the offsets in the stepped periphery of said screen, means to feed filtering material on to said screen, means to spread said material on said screen, means to operate said spreading means to vary the depth of said filtering material on said screen and rotating brush means pivoted outside of said screen to remove a portion or all of said filtering material during the rotation of said screen.

2. A sewage screening apparatus of the class described to intercept the complete flow of a sewage stream, including a chamber, a rotating screen in said chamber, means to rotate said screen, means to feed granulated filtering material on to said screen, means to spread said filtering material on said screen, means to remove said filtering material during the rotation of said screen, a stationary ring segment above said screen and near its periphery to retain said filtering material on said screen, a wearing ring segment opposite the periphery of said screen and means to hold a filtering medium outside of said stationary ring segment and seal the joint between the wearing ring segment and said screen.

3. In a screening apparatus, a rotating screen, means to feed filtering material on to said screen brush carrying means, rotating brushes pivoted on said brush carrying means to remove said filtering material in layers from said screen, means to rotate said brushes and means to raise and lower said brushes to vary the depth of said material removed during the rotation of said screen, said brush raising and lowering means including means to hold each brush about its pivot a fixed minimum distance above said screen while removing a top layer of material and means to resiliently support about its pivot each of said brushes on said screen while removing all material from said screen.

4. In a sewage screening apparatus for separating sewage solids from a sewage stream flowing by gravity through a portion of a perforated screen, a perforated rotating screen progressively submerged in said stream, means above the flow of said stream to deposit a filtering medium on said screen, means supported outside of said screen to retain said filtering medium near the outer line of the perforations of the submerged portion of said screen, means to adjust said supported means relative to said screen, means to rotate said screen and progressively submerge said screen in said stream to collect sewage solids from said stream flowing through said medium and to progressively emerge said screen and medium, means to remove said medium in layers from said screen and means to vary the depth of said medium removed during the rotation of said screen, said depositing means adjustable to replace the amount of filtering medium equal to the amount of medium removed.

5. In a sewage screening apparatus for separating sewage solids from a sewage stream flowing through a portion of a perforated screen, a perforated screen progressively submerged in said stream, means above the flow of said stream to spread a filtering medium on said screen, stationary means above the screen and inside of its periphery to retain said filtering medium on said screen, means to rotate said screen and progressively submerge said screen in said stream, means to hold a filtering medium outside of and over the periphery of said screen, means to cover said outside filtering medium where the sewage stream flows over said outside filtering medium and rotating brush means to remove the filtering medium in layers from said screen.

6. In a sewage screening apparatus for separating sewage solids from a sewage stream flowing by gravity through a portion of a screen, a screen progressively submerged in said stream, means above the flow of said stream to spread a filtering medium on said screen, stationary means inside of the submerged periphery of said screen to retain said filtering medium on said screen, means to rotate said screen, a wearing ring segment adjacent to the submerged periphery of said screen, means to hold a filtering medium at the joint between the submerged periphery of said screen and said wearing ring segment to filter sewage passing said peripheral joint, means to remove the medium from said screen in layers after it has emerged from said stream and means to vary the thickness of said layers removed from said screen.

7. In a sewage screening apparatus, a rotating screen, means to spread a filtering medium on a portion of said screen, means to deposit a filtering medium back of a portion of said screen, means to rotate said screen and progressively submerge said medium in a sewage stream to flow said stream through said medium and screen of one portion and through the screen and medium of another portion, means to seal the submerged screen periphery with a filtering medium, means to remove the filtering medium on said screen in layers after it has emerged from said sewage stream, means to vary the depth of said layers removed and means to remove the filtering medium back of a portion of said screen.

8. In a screening apparatus, a rotating screen, means to rotate said screen, a hopper for filtering material, a shaker to feed filtering material from said hopper onto said screen, a spreader to level the filtering material on said screen, rotating brushes to remove the filtering material from said screen in layers, means to vary the height of said brushes from said screen to remove a layer of said material as a portion of said material or as all of said material and means to vary the height of said spreader from said screen by the operation of said brush varying means.

9. In a screening apparatus, a rotating screen, means to rotate said screen, a hopper for filtering material, compartments in said hopper for holding filtering material, means to feed material into said compartments, means to discharge filtering material from each compartment onto said screen, a gate to control the discharge opening from each compartment, a spreader for each compartment to level the filtering material on said screen, means to control the discharge means from each compartment, rotating brushes to remove the filtering material from said screen in layers, means to regulate said brushes to vary the layers of material removed from said screen and means to regulate said spreaders to vary the depth of material spread onto said screen.

10. In a screening apparatus, a perforated rotating screen, means to feed filtering material on to said screen, stationary means above the peripheral portion over which sewage flows onto said screen to hold said filtering material on said screen near its periphery, adjustable means to support said materials holding means to regulate the clearance between said holding means and the top surface of said screen and to regulate the position of said holding means to the outer line of the perforations in said screen, rotating brushes to remove said filtering material from said screen and means to regulate the position of said brushes in relation to the top surface of said screen to remove said filtering material in layers from said screen and means to revolve said brushes across said screen and in a path parallel to the top surface of said screen in any position above said screen to which said brushes are regulated.

11. In a screening apparatus, a rotating screen, means to rotate said screen, hopper means for separately holding graded filtering materials, means to separately feed the different graded material from said hopper on to said screen, means to spread each graded material from said hopper in a layer on said screen, means to remove the filtering materials from said screen in one or more of the layers fed on to said screen and means to connect the spreading means and the removing means whereby the location of said removing means will control the location of said spreading means.

12. In a sewage screening apparatus of the class described including a rotating screen, means to rotate and progressively submerge said screen in a sewage stream, a hopper for filtering material, means to feed filtering material into said hopper, means to operate said feeding means, means to control said feed operating means, means to discharge said filtering material on to said rotating screen above said stream, means to operate said discharge means, means to control said discharge operating means, means to spread said filtering material on said screen, brush carrying means to sweep across said screen above said sewage stream, a revolving brush pivoted on said brush carrying means and means on said brush carrying means to regulate the position of said brush about the pivot to remove said filtering material.

13. In a sewage screening apparatus of the class described, a rotating screen, means to rotate said screen and progressively submerge said screen in a sewage stream, hopper means to separately hold filtering materials of different grades, means to separately discharge each grade of filtering material in a layer on said screen, means to separately feed a filtering material into said hopper means, means to control the discharge means whereby one or more grades will be discharged at a time on said screen, means to control the feeding of the different grades into said hopper whereby the said feeding will replenish the grade of material being discharged, brush carrying means pivoted outside the periphery of said screen to sweep across said screen, brushes pivoted on said brush carrying means, brush carrying means to rotate said brushes and means to adjust the position of said brushes on said brush carrying means whereby the filtering material is removed in layers from said screen.

14. In a screening apparatus for separating sewage solids from a sewage stream flowing through a portion of said screen, means to rotate said screen and progressively submerge said screen in said stream, a wearing ring segment overlapping the submerged periphery of said screen, means to adjust said ring segment, means to feed granulated filtering medium on to said screen, a brush to remove said filtering medium during the rotation of said screen, means to support and sweep said brush across said screen above said stream to remove said filtering medium, a drive shaft on said support to rotate said brush, means to pivot said brush on said drive shaft and means on said brush supporting means to adjust said brush about said drive shaft as a pivot.

15. In a screening apparatus, a rotating screen, means to rotate said screen, a wearing ring segment opposite the submerged periphery of said screen, means to hold a filtering material to seal the joint between said screen periphery and said wearing ring segment, brush carrying means pivoted outside the periphery of said screen to sweep across said screen, a revolving brush pivoted on said brush carrying means, means to regulate the position of said brush about its pivot and means to resiliently support said brush when contacting with the surface of said screen.

16. In a sewage screening apparatus for separating sewage solids from a sewage stream flowing by gravity through a portion of a screen, a screen progressively submerged in said stream, means to rotate said screen, a hopper for filtering material, screw means to feed material into said hopper, means to operate said screw, means to control the operation of said screw, means to discharge filtering material from said hopper on to said screen above the sewage stream, rotating brush carrying means pivoted outside of said screen, rotating brushes pivoted on said brush carrying means to remove said filtering material, means to adjust said brushes above said screen, said brush adjusting means including brush supporting means, each brush free to rise above its supporting means, and spring means to support each pivoted brush when in contact with said screen.

JOHN SCHAAF.